United States Patent [19]

Adler et al.

[11] 3,776,026

[45] Dec. 4, 1973

[54] ULTRASONIC FLAW DETERMINATION BY SPECTRAL ANAYLSIS

[75] Inventors: Laszlo Adler, Knoxville; Hubert L. Whaley, Powell, Tenn.

[73] Assignee: The United States of America as represented by the United States Atomic Energy Commission, Washington, D.C.

[22] Filed: Aug. 8, 1972

[21] Appl. No.: 278,843

[52] U.S. Cl. ............................... 73/67.7, 73/67.9
[51] Int. Cl. ............................................. G01n 29/04
[58] Field of Search ..................... 73/67.7, 67.8 R, 73/67.8 S, 67.9

[56] References Cited
UNITED STATES PATENTS 3,221,544   12/1965   Gunkel ............................ 73/67.8 S
3,299,694   1/1967   Dickenson ....................... 73/67.7 X
3,332,278   7/1967   Wood et al. ..................... 73/67.7
3,662,589   5/1972   Adler et al. ..................... 73/67.8 R

*Primary Examiner*—Richard C. Queisser
*Assistant Examiner*—John P. Beauchamp
*Attorney*—John A. Horan

[57] ABSTRACT

A method of quantitatively determining the size and orientation of flaws within a material. A broadband pulse having a frequency width of at least several MHz is used for an input pulse from an ultrasonic transducer which is directed toward the immersed test material which may contain a flaw, and the frequency interval between two consecutive frequency maxima of the reflected spectrum due to the difference in distance between each end of the flaw and a receiving transducer is relatable to both the size and orientation of the flaw.

6 Claims, 5 Drawing Figures

ULTRASONIC FLAW DETERMINATION BY SPECTRAL ANAYLSIS

BACKGROUND OF THE INVENTION

This invention was made in the course of, or under, a contract with the U. S. Atomic Energy Commission.

Determining the size of a flaw ultrasonically detected in a material is a major problem. The amplitude of an ultrasonic pulse that has interacted with the discontinuity in the material is usually used as an indication of the size of the flaw. In general, one expects the signal reflected from a large flaw to have a larger amplitude than that from a smaller flaw. Conversely, if a through-transmission technique is used, one expects the signal received after propagating through or around a larger flaw to be smaller than that from a smaller flaw. The problem is not this simple, however, since the amplitude is affected by a number of factors other than the physical size of the reflecting discontinuity (e.g., its orientation and composition and energy losses in the material at other interfaces and due to attenuation). For example, a small flaw oriented normal to the axis of the incident ultrasonic beam might appear larger than a much larger flaw lying at an angle that is less favorable for reflecting energy to the receiver. The amplitude of the energy reflected from the surface of a discontinuity in a material also depends on the relative acoustic impedances on either side of the interface, the greater the difference in acoustic impedance, the greater is the percentage of reflection. Therefore, a relatively small discontinuity, for example, if it is in effect an interface between metal and air (such as a crack, nonbond, or void), may reflect more energy than a much larger metallic inclusion.

The basic principle of ultrasonic frequency analysis as a means for determining the size and orientation of flaws in materials was described in our prior application Ser. No. 111,958, filed Feb. 2, 1971, now U.S. Pat. No. 3,662,589, and having a common assignee with the present application. As described therein, a single transmitter-receiver transducer was utilized. In order to obtain the necessary information to fully evaluate an unknown flaw, the transducer had to be positioned in at least three different orientations and a like number of simultaneous equations were solved to obtain the desired results. In addition to the complexity of the computations, certain errors are introduced in changing the angle of insonification.

The present invention was conceived to simplify the technique of determining the size and orientation of flaws using immersed ultrasonic inspection techniques in a manner to be described hereinbelow.

SUMMARY OF THE INVENTION

It is the object of the present invention to simplify the method of determining the size and orientation of flaws using immersed ultrasonic inspection techniques.

The above object has been accomplished in the present invention by utilizing a fixed, immersed ultrasonic transmitter for the insonification of the flaw with a broadband pulse and the detection of the reflected pulse from at least two angles in a given plane using one or more movable receivers. The frequency difference between two consecutive frequency maxima of the reflected spectrum at each of the receivers is then relatable to both the size and orientation of the flaw and these unknowns can be determined in a manner to be described hereinbelow.

DESCRIPTION OF THE PREFERRED EMBODIMENTS

The present invention is a modification of the method set forth in our prior patent application Ser. No. 111,958, filed Feb. 2, 1971, now U.S. Pat. No. 3,662,589. Instead of using a single movable transmitter-receiver transducer as was utilized in the prior application, the present invention utilizes a fixed transmitter and one or more movable receivers for the determination of flaw size and orientation in a manner to be described hereinbelow.

Figure 1:
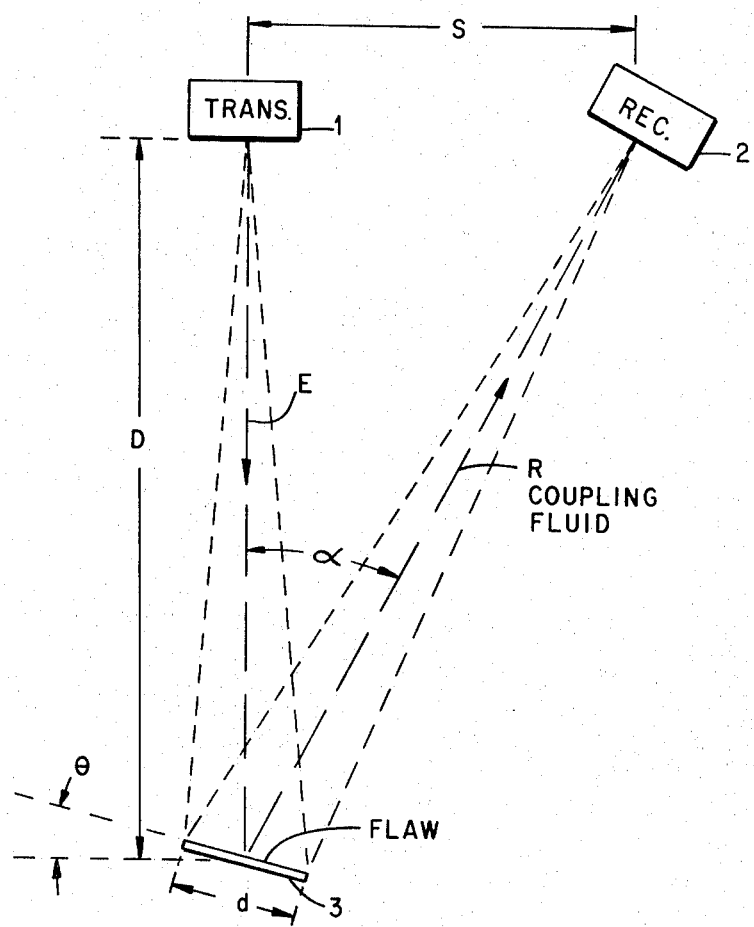
FIG. 1 is a schematic drawing illustrating the basic principle of the present invention.

Referring now to FIG. 1, the principle of the present invention is illustrated schematically with the geometrical relationship of the components. A transmitter 1 and a receiver 2 are sonically coupled with an appropriate fluid, such as water, so as to provide information for the evaluation of the size and orientation of a flaw 3 in a sample material, not shown. In this case, the orientation is $\theta$, the angle between the plane of the flaw and a plane perpendicular to the insonification direction E. Assuming a symmetrical flaw, the size is indicated as d. The distance from the transmitter 1 to the flaw is D, and to the receiver 2 is S. The angle between the insonification direction E and the reflected direction R is $\alpha$ which is equal to $\tan^{-1} S/D$. When $\theta$ equals zero, the frequency difference, $\Delta f$, between two consecutive frequency maxima of the reflected pulse due to the difference in distance between each end of the flaw and the receiver may be expressed as:

$$\Delta f = v/d \sin \alpha \quad (1)$$

where $v$ is the velocity of sound in the material containing the flaw. If, however, the flaw is not oriented in a plane perpendicular to $E$, the equation for $\Delta f$ becomes:

$$\Delta f = v/d \, [\sin (\alpha \pm \theta) + \sin \theta]. \quad (2)$$

The choice of the signs ($\pm$) depends upon whether the reflecting flaw is oriented away from or toward the receiver. If $\Delta f$ increases when $S$ is increased, the negative sign is taken. Thus, it may be seen that two measurements of $\Delta f$ are required at two different spacings of $S$.

Figure 2:
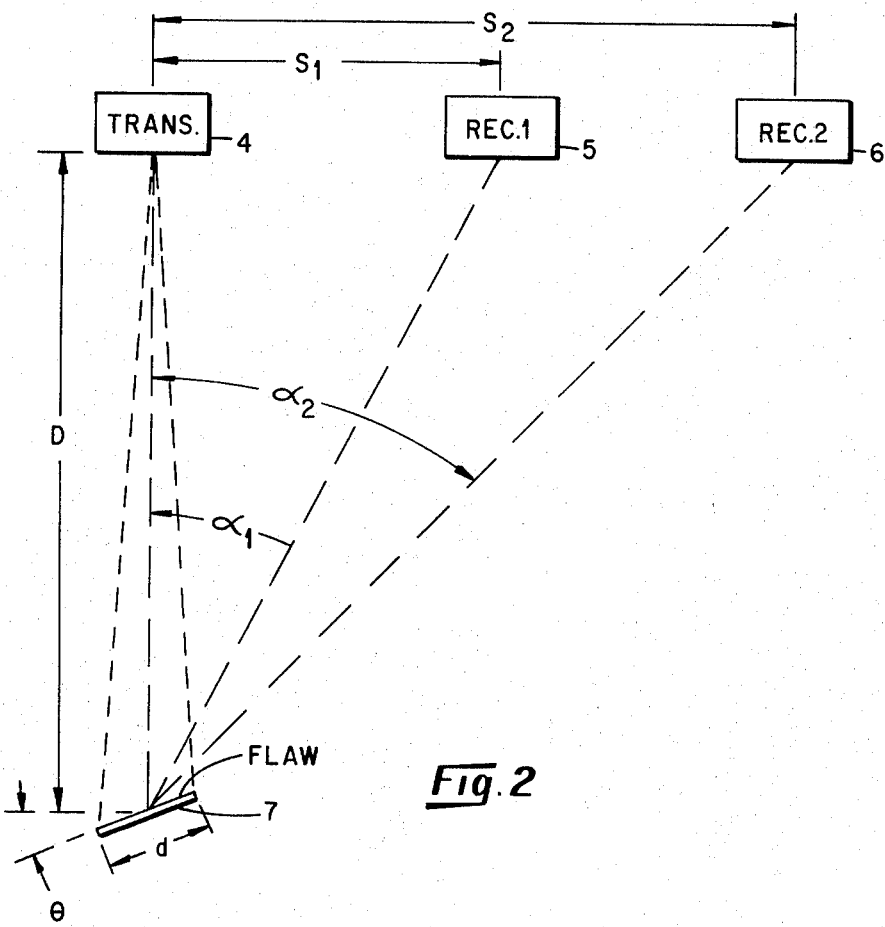
FIG. 2 is a schematic drawing illustrating a preferred embodiment of the invention.

The embodiment utilizing two receivers for effecting the two measurements is shown in FIG. 2. An ultrasonic broadband pulse is transmitted from a transmitter 4 to a flaw 7 and is then scattered to a first receiver 5 at a distance $S_1$ from the transmitter 4 and at an angle $\alpha_1$, therebetween, and a pulse is also scattered to a second receiver 6 at a distance $S_2$ from the transmitter 4 and at an angle $\alpha_2$ therebetween. Instead of using two receivers, the same receiver at the two respective positions could be used if desired. In any event, at spacing $S_1$, $$\Delta f_1 = v/d \ [\sin (\alpha_1 \pm \theta) + \sin \theta]; \quad (3)$$

and at spacing $S_2$, $$\Delta f_2 = v/d \ [\sin (\alpha_2 \pm \theta) + \sin \theta]. \quad (4)$$

These equations can then be solved for the two unknowns, $d$ and $\theta$, to provide the desired information.

Figure 3:
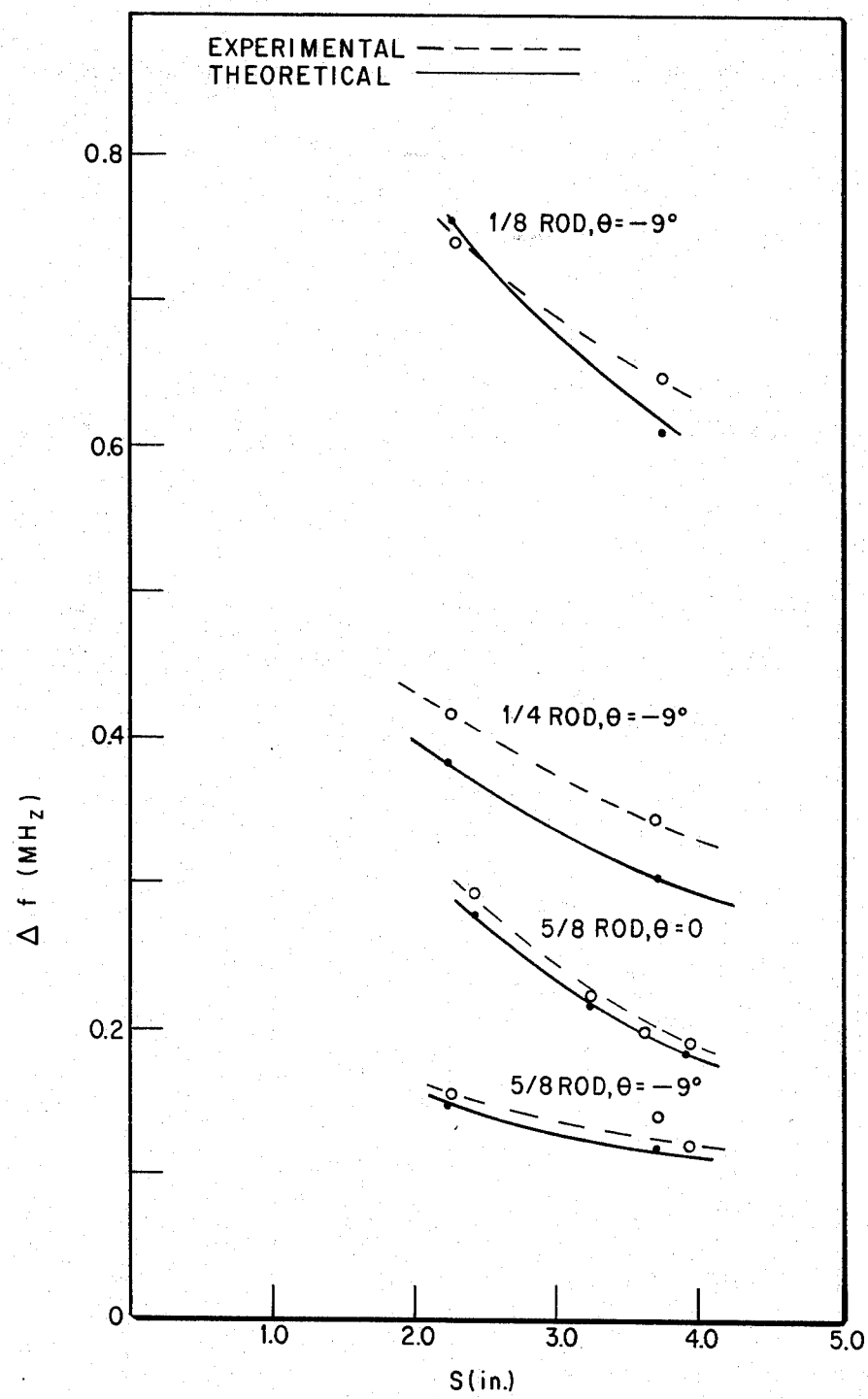
FIG. 3 is a graph illustrating the calculated and experimental values of $\Delta f$ associated with synthetic flaw sizes.

Using the two-angle method, tests were made with three sizes of flat-ended rods to determine the size of the end. The $\Delta f$ theoretical for each was compared to the actual measured value. The results are plotted in FIG. 3 as a function of the distance $S$. The fixed parameters are shown on the graph.

Figure 4:
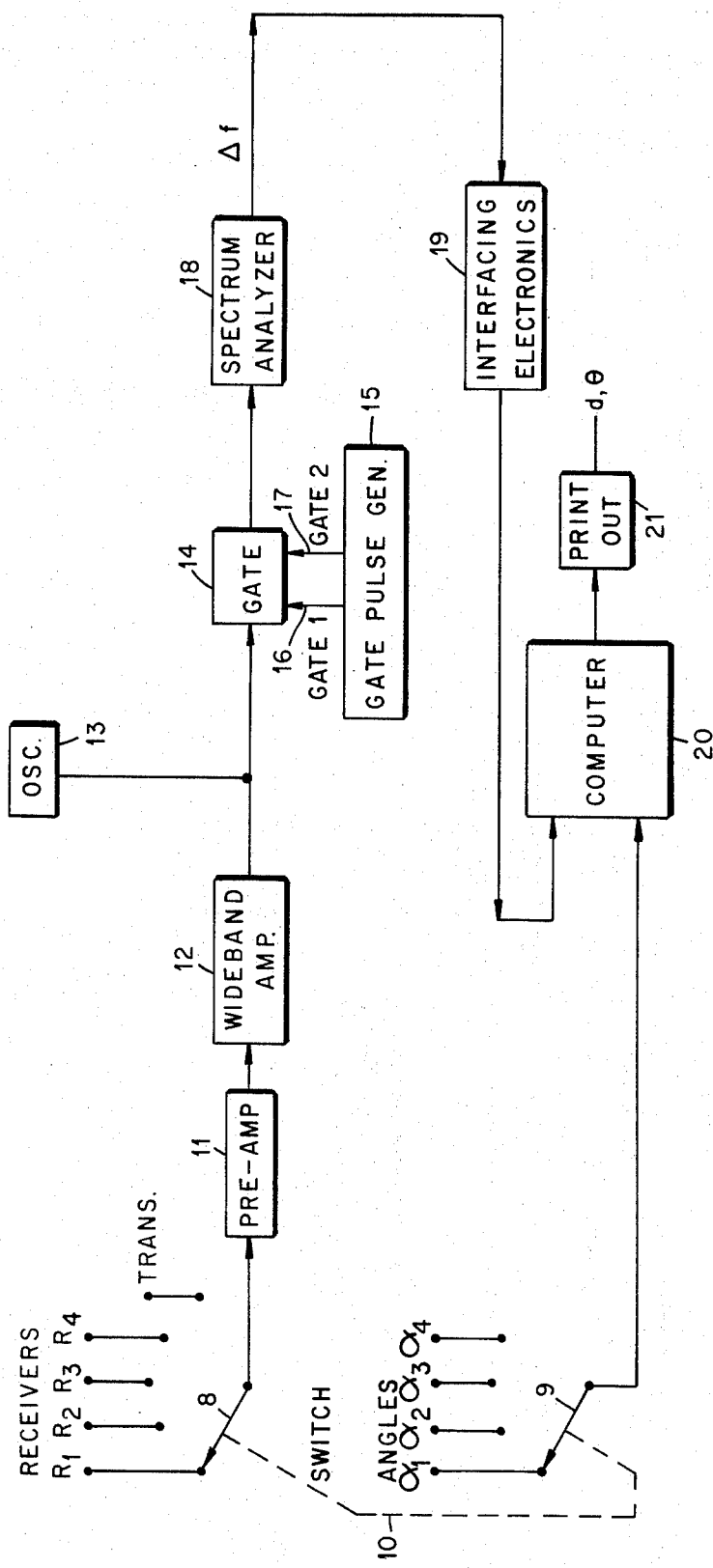
FIG. 4 is a block diagram of circuitry that may be utilized for the present invention.
Figure 5:
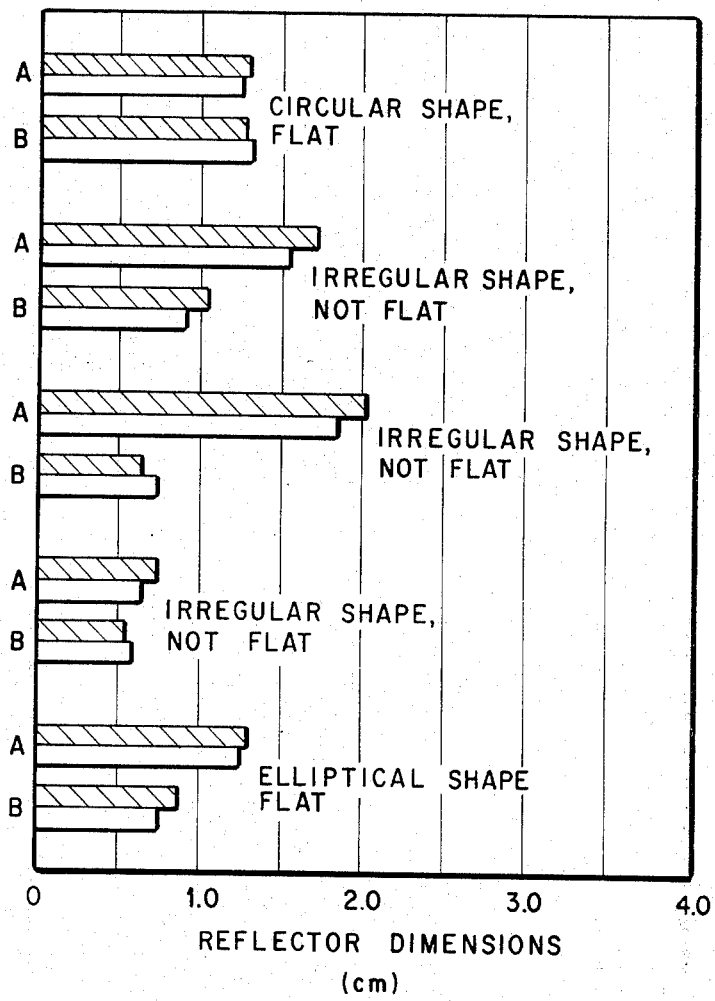
FIG. 5 is a chart which illustrates a comparison of actual specimen dimensions with those determined by the ultrasonic frequency analysis method of the present invention.

Most flaws found in practice are not sufficiently symmetrical to solve for a single value of $d$. Many, for example, are long and narrow and they may or may not be oriented such that the angle lies in the plane joining the transmitter and receiver (as in FIGS. 1 and 2). In order to determine the size of such flaws, either additional receivers may be permanently positioned which are not in line with the two receivers of FIG. 2, or preferably a mechanism to which the two receivers are attached can be pivoted about the transmitter with $S_1$ and $S_2$ (and $\alpha_1$ and $\alpha_2$) remaining the same. In either case, a switching circuit would be used to input the respective signals to a preamplifier of an electronic circuit such as illustrated in FIG. 4 to be described below. To demonstrate this analysis, several irregular brass shims were first measured dimensionally and then placed in a measuring tank. Spectral data was taken in two orthogonal planes to determine the dimsnsion of the reflector lying in each of these planes. These dimensions were assumed to be the average long and short dimensions of each of the respective reflectors. The effectiveness of the method of ultrasonic size determination utilizing the above equations (3) and (4) ) for determining the size in each plane of the respective test pieces is illustrated in FIG. 5, in which are shown the experimentally determined long and short dimensions of five different reflectors when compared with their actual average values. It can be seen that good results were obtained for reflector size in each case.

The electronic circuit, illustrated in FIG. 4, may be used for determining flaw size of symmetrical flaws or irregular flaws. For symmetrical flaws, only the receivers $R_1$ and $R_2$ and the corresponding angles $\alpha_1$ and $\alpha_2$ are required for determining flaw size and orientation. For irregular flaws, the receivers $R_1$ and $R_2$, and angles $\alpha_1$ and $\alpha_2$ are used for determining the flaw size and orientation in one plane, while the receivers $R_3$ and $R_4$, and angles $\alpha_3$ and $\alpha_4$ are used for determining the flaw size and orientation in an orthogonal plane. Actually, the receivers $R_1$ and $R_2$ may be used for measurements in one plane and then rotated to make measurements in the other plane. Also, the angle $\alpha_1$ may be chosen to be the same as $\alpha_4$, and the angle $\alpha_2$ chosen the same as $\alpha_3$ to simplify analysis.

The circuit of FIG. 4 is essentially the same as the readout circuit described in the above-mentioned prior patent application, except the reflected pulse from a flaw is fed to a separate receiver or receivers, rather than back to a combined transmitter-receiver transducer as was done in the prior application. In FIG. 4, a reflected pulse from a flaw is fed from a selected receiver by a switch arm 8 of a switch 10 to a preamplifier 11. The output of the unit 11 is connected to a wide-band amplifier 12 whose output is connected jointly to an oscilloscope 13 and to a gate 14. A gate pulse generator 15 is connected as two inputs over leads 16 and 17 to the gate 14. The output of the gate 14 is connected to a spectrum analyzer 18 which determines the $\alpha f$ for each connected receiver. The $\Delta f$ output of the unit 18 is connected to a computer 20 by way of interfacing electronics 19. The corresponding selected $\alpha$ angle information is connected to the computer 20 by means of a switch arm 9 of the switch 10. The selected $\alpha$ angle input to the computer may be derived from different potentiometer settings, the value of which is a function of the desired angle, for example. The output of the computer 20 is connected to a printout unit 21 which provides a readout of the unknown parameters $d$ and $\theta$ for the unknown flaw.

A dual electronic gate is normally utilized in the system of FIG. 4 for selecting portions of the complex reflected r.f. signal for analysis, and such a gate is necessary for all but the simplest of reflector shapes. Reflectors with irregular contours may reflect specularly in a number of directions, and care must be taken not to analyze these specular signals. They may be recognized as large abrupt changes in signal amplitude as a receiver position is varied. To eliminate such signals, the receiver is rotated to a position about the transmitter where no specular reflections are obtained. Thus, the specular signals are separated from the desired scattered signals from the edges of the reflector.

In the operation of the system of FIG. 4, a pair of receivers ($R_1$ and $R_2$) are properly positioned in accordance with the above procedure in one plane and at respective angles $\alpha_1$ and $\alpha_2$ and a $\Delta f$ [equation (3) ] is obtained for one receiver and fed to the computer and then another $\Delta f$ [equation (4) ] is obtained for the other receiver and fed to the computer. The computer is then programmed to solve for d and $\theta$ in that one plane. After this is accomplished, then the receivers $R_3$ and $R_4$ positioned in an orthogonal plane to the first plane and at respective angles $\alpha_3$ and $\alpha$ to the transmitter are sequentially connected to the readout system for determining the values of $d$ and $\theta$ for the second plane in the same manner as was done for the first plane. It should be noted that the receivers $R_1$ and $R_2$ may be used in each respective plane rather than using the two other receivers $R_3$ and $R_4$ by simply rotating the receivers about the transmitter from one plane to the other in determining the respective values of $d$ and $\theta$.

It should be noted that the measurements for determining the respective values of $d$ and $\theta$ may be made in any number of selected or desired planes to increase the accuracy of the description of the flaw. There is nothing special about choosing orthogonal planes for taking measurements except that for a minimum number of measurements that would give the most information. The number of such additional planes may be at least three, for example, such that respective measurements would be made in a total of four planes.

The method of determining the values of $d$ and $\theta$ in the present invention has been simplified in that only two equations are required to solve for $d$ and $\theta$, while in our prior application, three very complex equations were required to solve for these unknowns and this was because a single transmitter-receiver transducer was utilized therein and three different $\Delta f$ determinations had to be made.

This invention has been described by way of illustration rather than limitation and it should be apparent that it is equally applicable in fields other than those described.

What is claimed is:

1. A nondestructive method for determining the size and orientation of a randomly oriented flaw within a material sample comprising the steps of generating an ultrasonic pulse having a wide frequency spectrum by a transmitter, receiving with a first receiver positioned in a plane with and at a known spacing distance from said transmitter ultrasonic signals reflected from any flaw in said sample in close proximity to said transmitter, analyzing the frequency spectrum of the reflected signals to determine a first frequency interval between two consecutive frequency maxima of said reflected pulse, recording said first frequency interval generating a second ultrasonic pulse by said transmitter, receiving with a second receiver positioned in said plane with and at a second known spacing distance from said transmitter second ultrasonic signals reflected from said flaw in said sample, analyzing the frequency spectrum of said second reflected signals to determine a second frequency interval between two consecutive frequency maxima of said second reflected pulse, recording said second frequency interval, and finally utilizing the recorded frequency intervals obtained for each respective position of said receivers for determining the size and orientation of the flaw in said sample.

2. The method set forth in claim 1, wherein said first frequency interval is designated $\Delta f_1$, and wherein said first frequency interval at said first spacing distance may be expressed by a first equation:

$$\Delta f_1 = v/d \; [\sin\,(\alpha_1 \pm \theta) + \sin\,\theta],$$

where
  $v =$ velocity of sound in said sample in which it is propagating when said flaw is encountered;
  $\theta =$ orientation of said flaw in said plane;
  $\alpha_1 =$ angle between said transmitter and said first receiver with respect to said flaw;
  $d =$ dimension of said flaw in said plane;
and further wherein said second frequency interval is designated $\Delta f_2$, said $\Delta f_2$ at said second spacing distance may be expressed by a second equation:

$$\Delta f_2 = v/d \; [\sin\,(\alpha_2 \pm \theta) + \sin\,\theta],$$

where $\alpha_2$ is equal to the angle between said transmitter and said second receiver with respect to said flaw, whereby the unknow values of $d$ and $\theta$ are determined by solving said equations simultaneously by means of a computer.

3. The method set forth in claim 2, and further including the step of ratating said receivers about said transmitter to a second plane orthogonal to said first plane, and repeating all of said steps of said preceding claim while said receivers are positioned in said second plane for determing the size and orientation of said flaw in said second plane.

4. The method set forth in claim 3, and further including the steps of determining said points of maxima in said reflected spectrum for each position of said receivers by an electronic frequency spectrum analyzer.

5. The method set forth in claim 2, and further including the steps of sequentially rotating said receivers about said transmitter to a plurality of additional planes, and repeating all of said steps of said preceding claim for each additional plane while said receivers are positioned in each respective one of said additional planes for sequentially determining the size and orientation of said flaw in each of said additional planes.

6. The method set forth in claim 5, wherein the number of said additional planes is at least three.

* * * * *